United States Patent
Adjakple et al.

(10) Patent No.: US 8,320,827 B2
(45) Date of Patent: Nov. 27, 2012

(54) METHOD AND APPARATUS FOR PERFORMING HANDOVER WITH A RELAY NODE

(75) Inventors: Pascal M. Adjakple, Great Neck, NY (US); Stephen E. Terry, Northport, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 335 days.

(21) Appl. No.: 12/816,002

(22) Filed: Jun. 15, 2010

(65) Prior Publication Data

US 2010/0322197 A1  Dec. 23, 2010

Related U.S. Application Data

(60) Provisional application No. 61/187,809, filed on Jun. 17, 2009, provisional application No. 61/187,879, filed on Jun. 17, 2009.

(51) Int. Cl.
H04B 3/36 (2006.01)
(52) U.S. Cl. .......................................... 455/7
(58) Field of Classification Search .......... 370/310, 370/328, 329, 331; 455/403, 422.1, 436, 455/442, 7, 11.1, 12.1, 13.1; 379/90.01, 379/100.01, 100.09
See application file for complete search history.

(56) References Cited

U.S. PATENT DOCUMENTS

| | | | |
|---|---|---|---|
| 8,140,077 B2 * | 3/2012 | Saifullah et al. | 455/438 |
| 8,175,014 B2 * | 5/2012 | Terry et al. | 370/278 |
| 2003/0189909 A1 | 10/2003 | Chao et al. | |
| 2006/0256794 A1 * | 11/2006 | Rezaiifar et al. | 370/394 |
| 2008/0188224 A1 | 8/2008 | Pani et al. | |
| 2008/0219275 A1 * | 9/2008 | Boariu et al. | 370/401 |
| 2010/0296431 A1 * | 11/2010 | Terry et al. | 370/315 |

FOREIGN PATENT DOCUMENTS

| | | |
|---|---|---|
| EP | 2 051 454 | 4/2009 |
| WO | 2007/130325 | 11/2007 |

OTHER PUBLICATIONS

Motorola, "Handovers Involving Type-1 Relay Node," 3GPP TSG-RAN-WG2 Meeting #66, San Francisco, U.S.A., May 4-8, 2009.
Motorola, "Layer-2 Structure for Un Interface," 3GPP TSG-RAN-WG2 Meeting #66, San Francisco, U.S.A., May 4-8, 2009.
Motorola, "MAC-Layer Functions for Relay Operation," 3GPP TSG-RAN-WG2 Meeting #66, San Francisco, U.S.A., May 4-8, 2009.

(Continued)

*Primary Examiner* — Fan Ng
(74) *Attorney, Agent, or Firm* — Volpe and Koenig, P.C.

(57) ABSTRACT

Techniques for performing a handover in a network with a relay node (RN) are disclosed. The RN is a node deployed between an eNodeB (eNB) and a wireless transmit/receive unit (WTRU). The RN receives data from one of the eNB and the WTRU and forwards it to the other. The RN receives a packet data convergence protocol (PDCP) protocol data unit (PDU) from a serving donor evolved Node-B (DeNB) and transmits it to the WTRU. The RN makes a handover decision based on the measurement report received from the WTRU. After making a handover decision, the RN sends a handover request or a control message to the serving DeNB including a first unsuccessfully transmitted PDCP sequence number (SN). The serving DeNB then discards a PDCP PDU with an SN older than the first unsuccessfully transmitted PDCP SN.

25 Claims, 10 Drawing Sheets

OTHER PUBLICATIONS

NTT DOCOMO, "Relay Requirements & Use Case Study in LTE-Advanced," 3GPP TSG-RAN2 #66, San Francisco, U.S.A., May 4-8, 2009.

RAN3 LTE-A Rapporteur, "LTE-A RAN3 Baseline Document," 3GPP TSG RAN WG3 Meeting #64, San Francisco, U.S.A., May 4-8, 2009.

Third Generation Partnership Project, "Technical Specification Group Radio Access Network; Requirements for Further Advancements for Evolved Universal Terrestrial Radio Access (E-UTRA) (LTE-Advanced) (Release 8)," 3GPP TR 36.913 V8.0.1, (Mar. 2009).

Third Generation Partnership Project, "Technical Specification Group Radio Access Network; Evolved Universal Terrestrial Radio Access (E-UTRA); Further Advancements for E-UTRA Physical Layer Aspects (Release 9)," 3GPP TR 36.814 V1.0.0 (Feb. 2009).

Third Generation Partnership Project, "Technical Specification Group Radio Access Network; Evolved Universal Terrestrial Radio Access (E-UTRA); Further Advancements for E-UTRA Physical Layer Aspects (Release 9)," 3GPP TR 36.814 V9.0.0 (Mar. 2010).

Third Generation Partnership Project, "Technical Specification Group Radio Access Network; Evolved Universal Terrestrial Radio Access (E-UTRA); Packet Data Convergence Protocol (PDCP) Specification (Release 8)," 3GPP TS 36.323 V8.5.0 (Mar. 2009).

Third Generation Partnership Project, "Technical Specification Group Radio Access Network; Evolved Universal Terrestrial Radio Access (E-UTRA); Packet Data Convergence Protocol (PDCP) Specification (Release 9)," 3GPP TS 36.323 V9.0.0 (Jan. 2010).

Third Generation Partnership Project, "Technical Specification Group Core Network and Terminals; General Packet Radio System (GPRS) Tunneling Protocol User Plane (GTPv1-U) (Release 8)," 3GPP TS 29.281 V8.2.0 (Jun. 2009).

Third Generation Partnership Project, "Technical Specification Group Core Network and Terminals; General Packet Radio System (GPRS) Tunneling Protocol User Plane (GTPv1-U) (Release 9)," 3GPP TS 29.281 V9.2.0 (Apr. 2010).

Third Generation Partnership Project, "Technical Specification Group Radio Access Network; Evolved Universal Terrestrial Radio Access (E-UTRA) Medium Access Control (MAC) Protocol Specification (Release 8)," 3GPP TS 36.321 V8.5.0 (Mar. 2009).

Third Generation Partnership Project, "Technical Specification Group Radio Access Network; Evolved Universal Terrestrial Radio Access (E-UTRA) Medium Access Control (MAC) Protocol Specification (Release 9)," 3GPP TS 36.321 V9.2.0 (Mar. 2010).

Third Generation Partnership Project, "Overview of 3GPP Release 8 V0.0.6," (Apr. 2009).

Third Generation Partnership Project, "Technical Specification Group Radio Access Network; Evolved Universal Radio Access (E-UTRA); Packet Data Convergence Protocol (PDCP) Specification (Release 9)," 3GPP TS 36.323 V9.0.0 (Jan. 2010).

* cited by examiner

METHOD AND APPARATUS FOR PERFORMING HANDOVER WITH A RELAY NODE

CROSS REFERENCE TO RELATED APPLICATIONS

This application claims the benefit of U.S. provisional application No. 61/187,809 filed Jun. 17, 2009 and 61/187,879 filed Jun. 17, 2009, which are incorporated by reference as if fully set forth.

FIELD OF INVENTION

This application is related to wireless communications.

BACKGROUND

In long term evolution advanced (LTE-A), the concept of a Relay Node (RN) has been introduced. The RN is a node deployed between an eNodeB (eNB) (i.e., base station) and a wireless transmit/receive unit (WTRU). The RN receives data from one of the eNB and the WTRU and forwards it to the other. The WTRU link quality to and from the RN would be better than the direct link to and from the eNB because the RN is closer to the WTRU, and therefore the performance of the link between the eNB and the WTRU would be increased by introducing the RN.

The RN is intended to be a low cost option to installing an eNB when an improved coverage is needed but it may also be used to improve the capacity of the radio network. The cost reduction is achieved by eliminating the capital and operating expenses associated with a wired link to the network. Instead of a wired link, the RN communicates wirelessly to a "donor eNB" (DeNB) which provides a link to the network. To legacy WTRUs, (i.e., third generation partnership project (3GPP) release 9 or earlier WTRUs), the RN looks just like an eNB. FIG. 1 shows an example deployment of the RN along with the DeNB and also shows the interfaces related to the RN and the DeNB.

With RN deployment in LTE-A, a handover between the RNs and the eNBs may occur. The following handover scenarios are expected: a WTRU moving from an RN to its own serving donor eNodeB, a WTRU moving from an RN to a neighboring donor eNodeB, a WTRU moving from one RN to another RN served by the same donor eNodeB, a WTRU moving from one RN to another RN served by a neighboring donor eNodeB, a WTRU moving from a donor eNodeB to an RN served by the same donor eNodeB, a WTRU moving from a neighboring donor eNodeB to an RN served by a different donor eNodeB, etc.

When the WTRU needs to be handed over from an RN (either to another RN or to a DeNB), in the case of radio link control (RLC) unacknowledged mode (UM), the packet data convergence protocol (PDCP) service data units (SDUs) in the RN for which the transmission in the downlink has not yet been completed by the RLC should be forwarded to the DeNB via the wireless backhaul link. In the case of RLC acknowledged mode (AM), for downlink transmission, in addition to the PDCP SDUs that could not be transmitted, the RN also has to forward the PDCP SDUs that have not been acknowledged successfully at the RLC layer by the WTRU. These data packet re-forwarding instances are necessary because the DeNB may have deleted the PDCP SDUs transmitted earlier to the RN, given the fact that both the backhaul link (Un) and the access link (Uu) operate independently and implement separate peer-to-peer data link level transmission protocol stacks, as shown in FIGS. 2-9. Data re-forwarding wastes backhaul resources twice, (i.e., the resources used to transmit the data from the DeNB to the RN, and the resources used to retransmit the data from the RN to the DeNB).

Examples of user plane (U-plane) and control plane (C-plane) protocol architecture as being considered in LTE-A are shown in FIGS. 2-9. FIGS. 2 and 3 show C-plane and U-plane architectures for full-L3 relay, which is transparent for the DeNB. FIGS. 4 and 5 show C-plane and U-plane architectures for proxy S1/X2, (i.e., the RN looks like a cell under the DeNB to the mobility management entity (MME)). FIGS. 6 and 7 show C-plane and U-plane architectures where the RN bearers terminate in the RN. FIGS. 8 and 9 show C-plane and U-plane architectures where the S1 interface terminates in the DeNB.

It would be desirable to reduce or avoid data re-forwarding from the RN to the DeNB during handover, and to minimize the amount of data transferred from the DeNB to the RN that needs to be re-forwarded back to the serving DeNB during handover, and reduce the handover completion time due to unnecessary data exchange between the RN and the serving DeNB.

SUMMARY

Embodiments for performing a handover in a network with an RN are disclosed. The RN is a node deployed between an eNB and a WTRU. The RN receives data from one of the eNB and the WTRU and forwards it to the other. The RN may make a handover decision based on the measurement report received from the WTRU. After making a handover decision, the RN sends a handover request or a control message to the serving DeNB including a first unsuccessfully transmitted PDCP sequence number (SN). The serving DeNB then discards a PDCP PDU with an SN older than the first unsuccessfully transmitted PDCP SN.

The RN and the serving DeNB may maintain a mapping table between a PDCP SN of data transmitted to the WTRU over a wireless interface between the RN and the WTRU and a PDCP SN of data received by the RN over a wireless interface between the RN and the serving DeNB. The RN may provide the serving DeNB with WTRU context information during a call setup including at least one of a WTRU context identity (ID), RN bearer information, WTRU bearer information, RN bearer ID, and WTRU bearer ID.

The serving DeNB forwards the handover request message to the target eNB. The target eNB performs an admission control. The target eNB sends a handover request ACK message to the serving DeNB. The serving DeNB forwards data to the target eNB. The WTRU performs synchronization to the target eNB and accesses the target cell via an RACH, and the target eNB responds with UL allocation and timing advance, and when the WTRU has successfully accessed the target cell, the WTRU sends the RRC handover complete message. The target eNB sends a path switch request message to the MME/GW to inform that the WTRU has changed cell. The serving GW switches the downlink data path to the target eNB and sends one or more S1-UP end marker packets on the old path to the source RN and/or the source DeNB and then releases any U-plane/transport network layer (TNL) resources towards the source RN.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, a sensor, a machine-to-machine (M2M) device, or any other type of device capable of operating in a wireless environment. When referred to hereafter, the terminology "evolved NodeB (eNB)", "DeNB", or "RN" includes but is not limited to a base station, a site controller, an access point (AP), or any other type of interfacing device capable of operating in a wireless environment.

Even though the embodiments are disclosed with reference to 3GPP LTE and LTE-A, it should be noted that the embodiments are not limited to LTE or LTE-A, but are applicable to any wireless communication technologies that are currently existing or will be developed in the future including, but not limited to, 3GPP wideband code division multiple access (WCDMA), cdma2000, IEEE 802.xx, etc. It should also be noted that the embodiments described herein may be applicable in any order or combinations, and any particular part of the embodiment may be independently implemented without the remaining part of the embodiment. It should also be noted that the embodiments disclosed herein may be implemented in any protocol architecture including RNs that are currently discussed or will be developed in the future.

Figure 1:
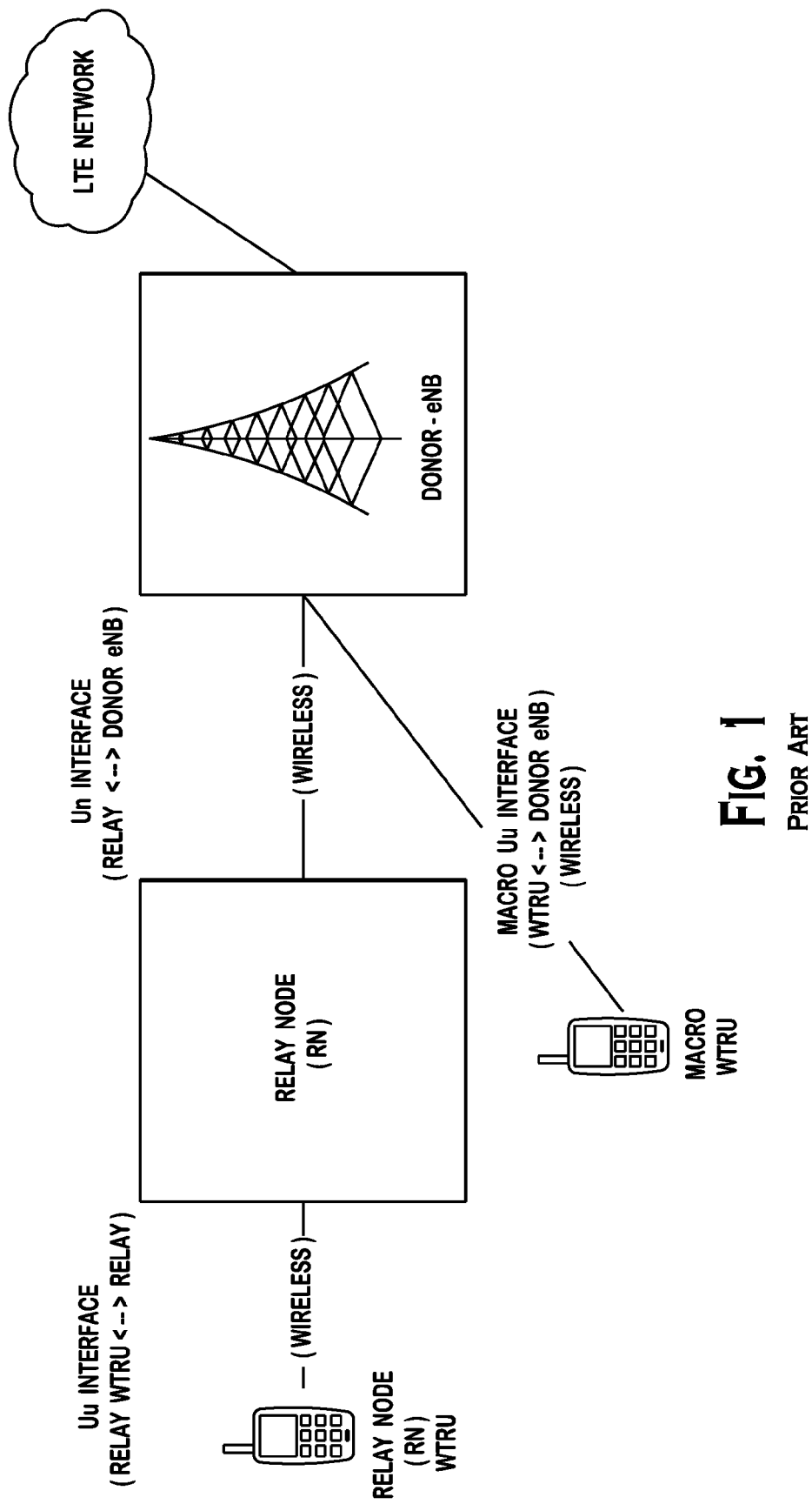
FIG. 1 shows an example relay deployment architecture.
Figure 2:
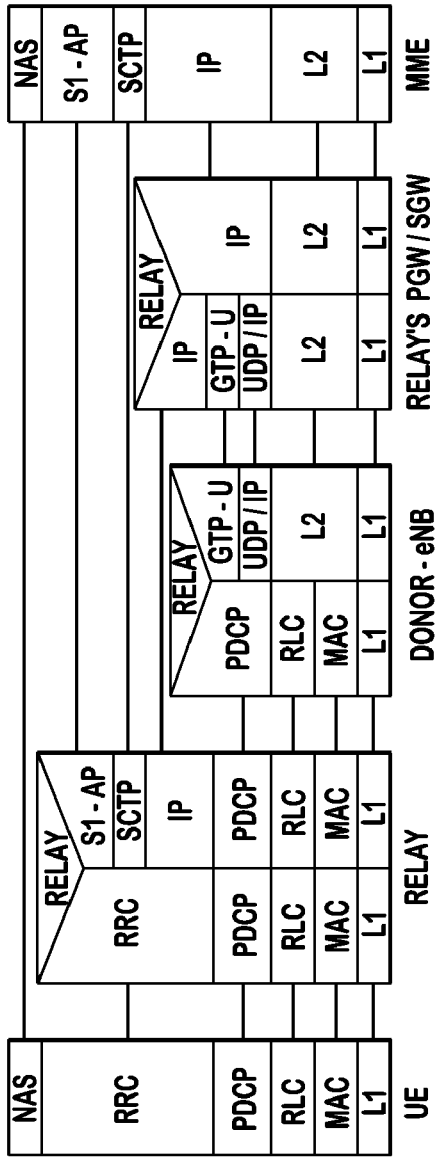
FIGS. 2-9 show examples of U-plane and C-plane protocol architectures as being considered in LTE-A.
Figure 3:
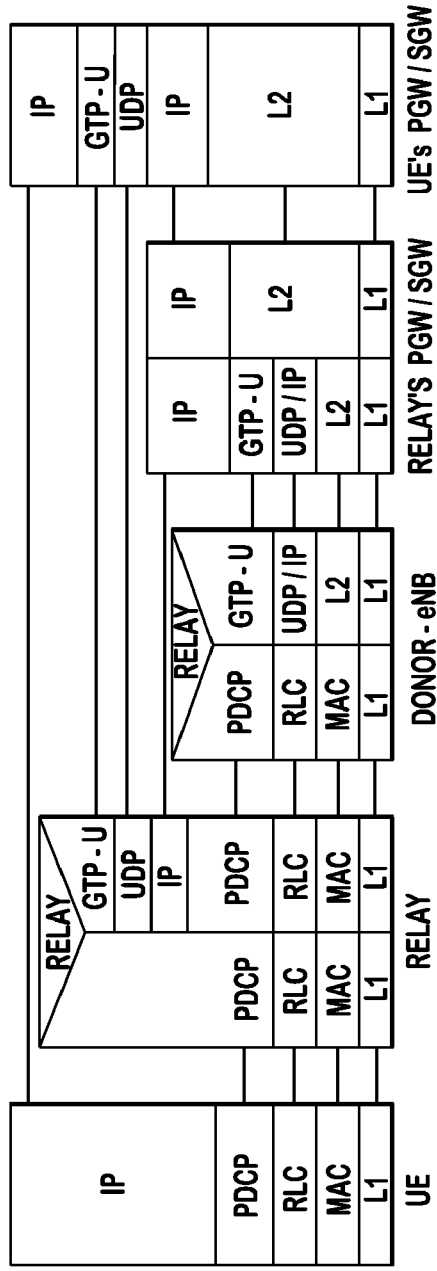
Figure 4:
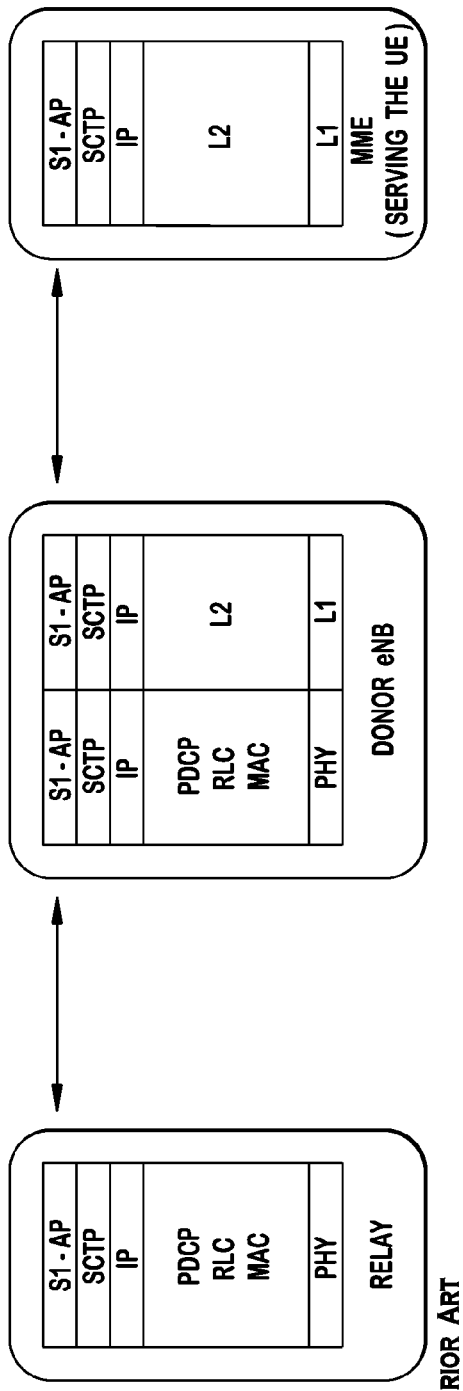
Figure 5:
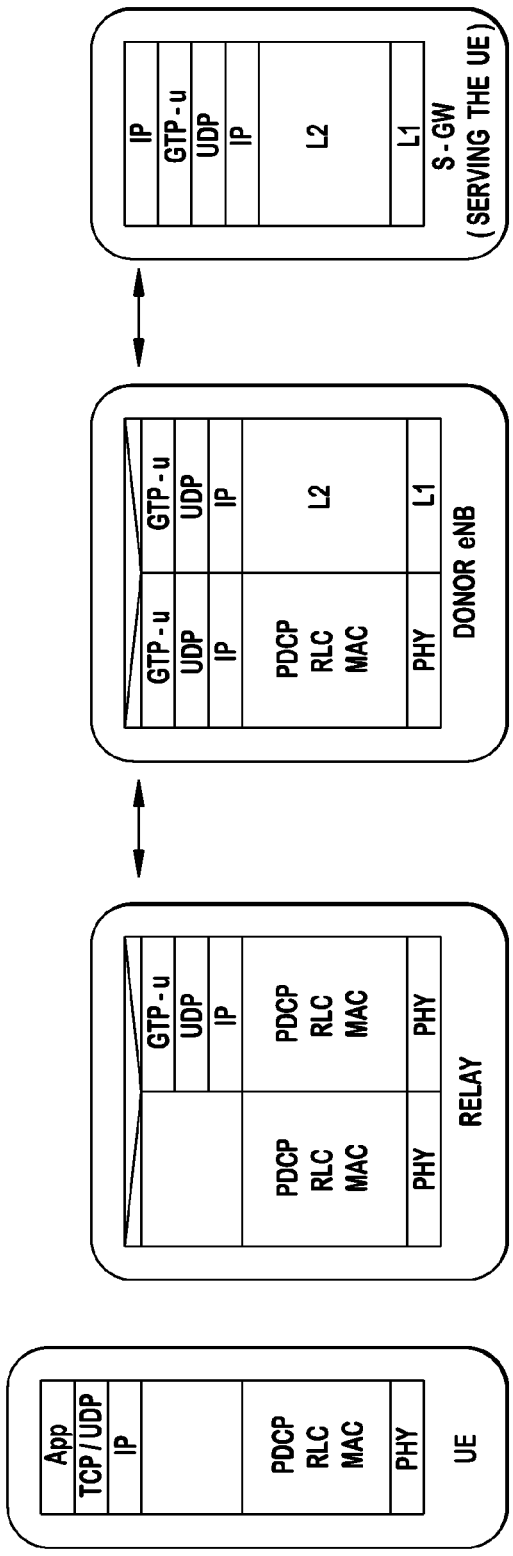
Figure 6:
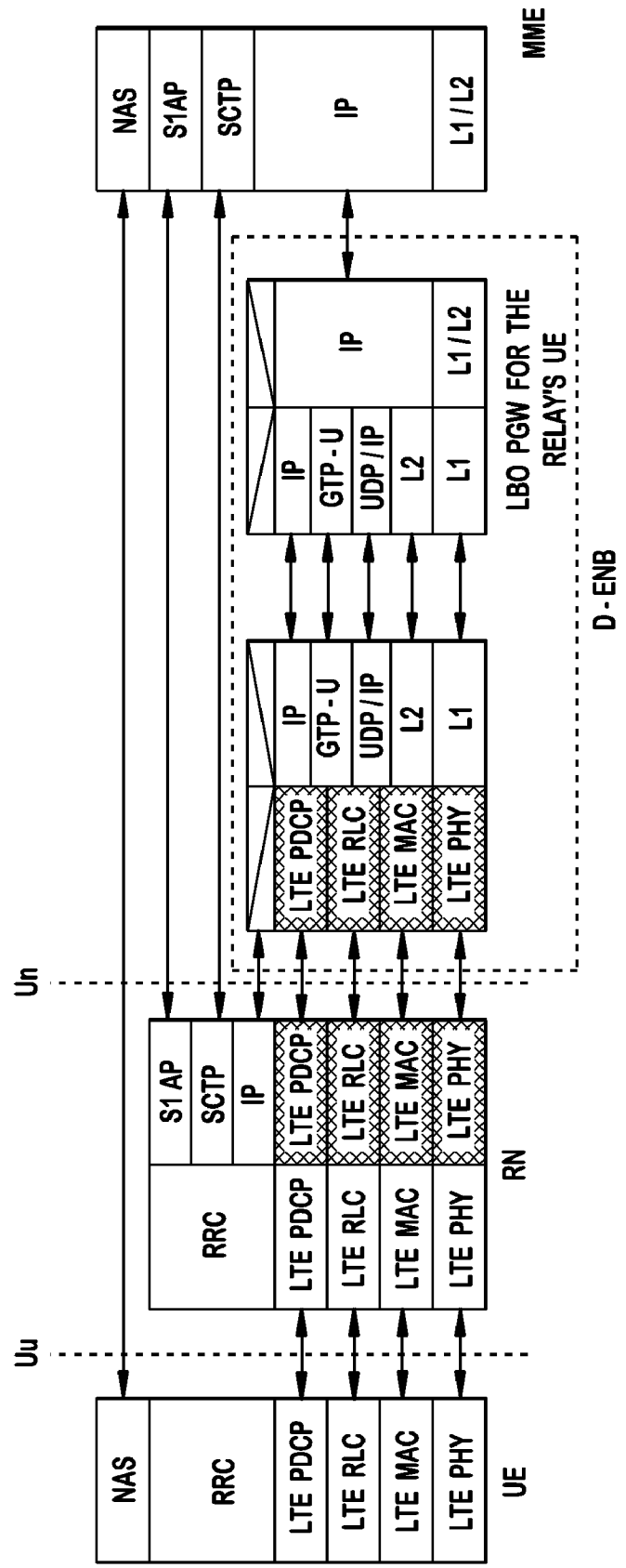
Figure 7:
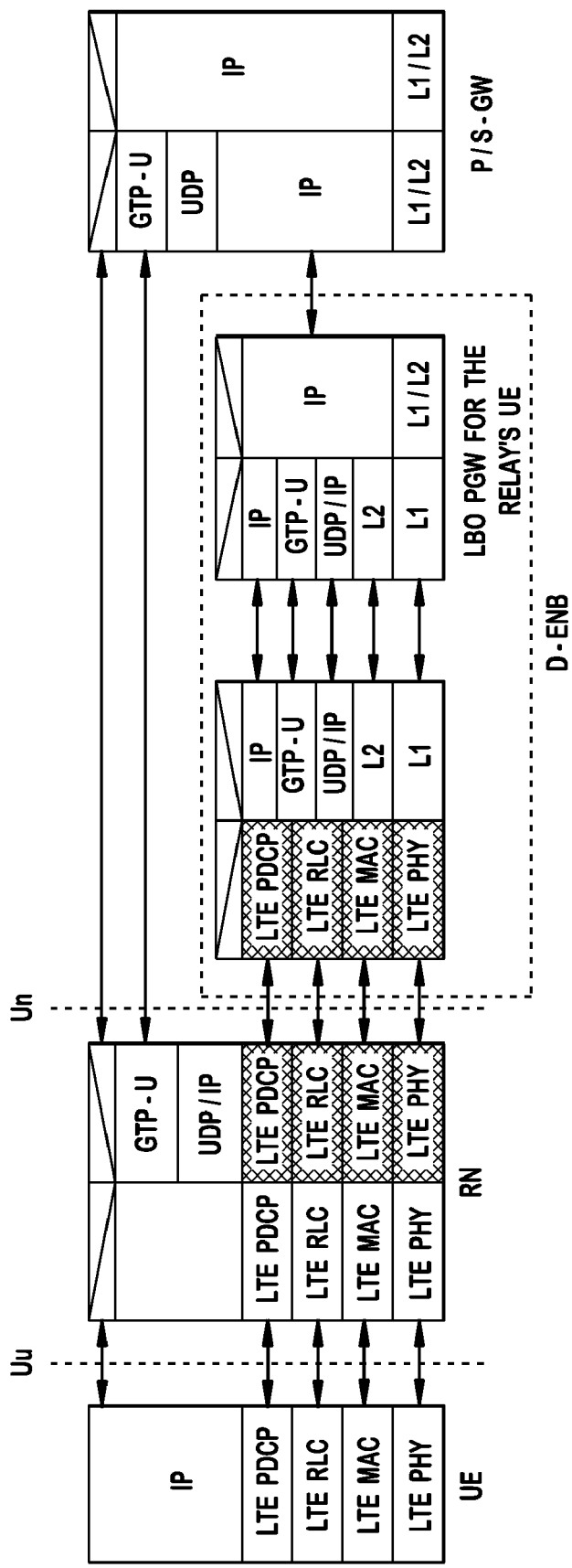
Figure 8:
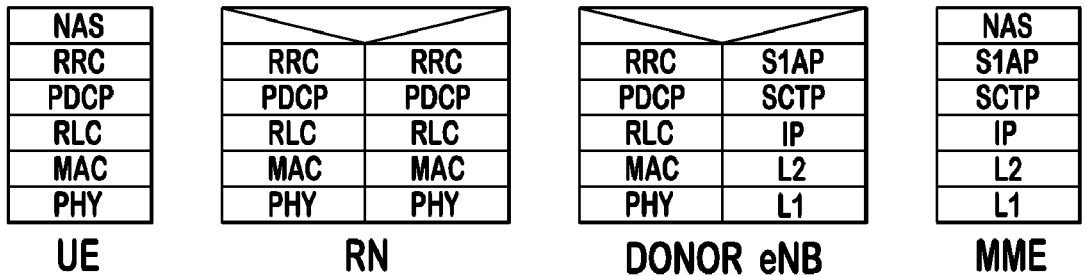
Figure 9:
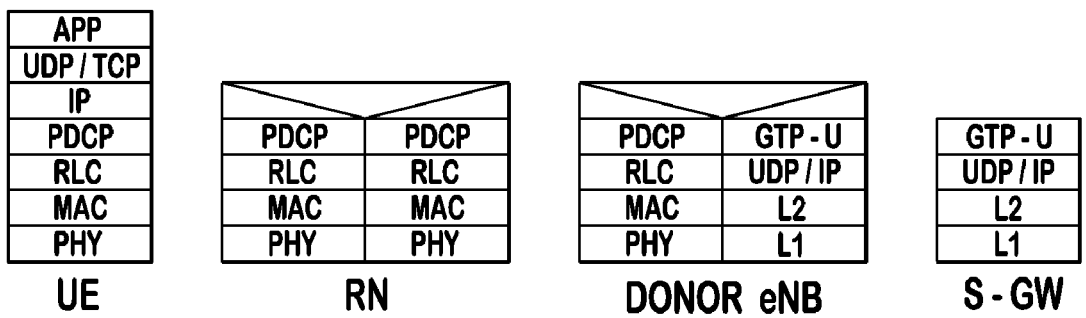
Figure 10:
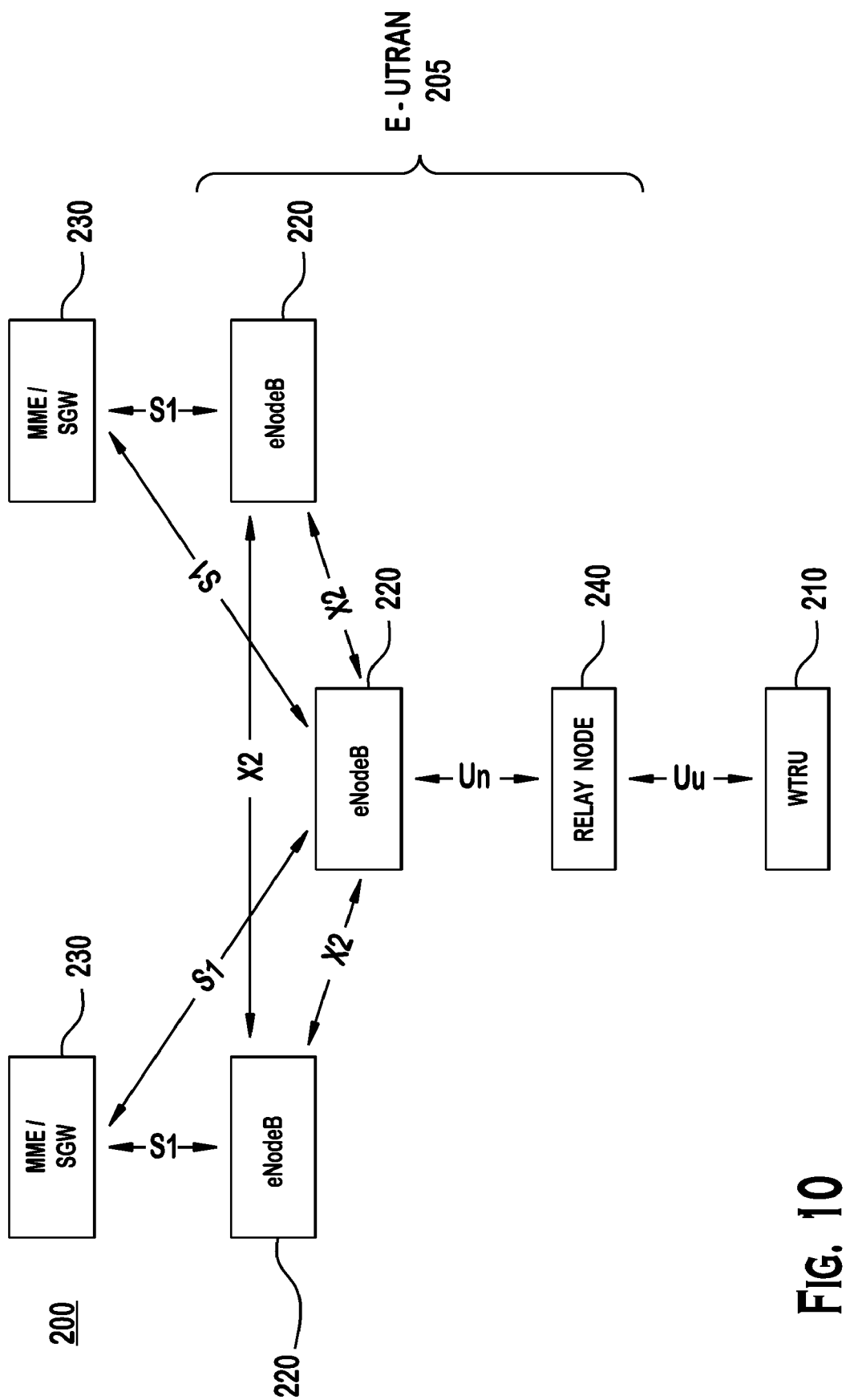
FIG. 10 shows an LTE wireless communication system/access network that includes an Evolved-Universal Terrestrial Radio Access Network (E-UTRAN)

FIG. 10 shows an LTE wireless communication system/access network 200 that includes an Evolved-Universal Terrestrial Radio Access Network (E-UTRAN) 205. The E-UTRAN 205 includes several eNBs 220 and at least one RN 240. The WTRU 210 may be in communication with either an eNB 220 or an RN 240. The eNBs 220 interface with each other using an X2 interface. Each of the eNBs 220 interfaces with a Mobility Management Entity (MME)/Serving GateWay (S-GW) 230 through an S1 interface. The eNBs 220 interface with an RN using a Un interface. The RN 240 or the eNBs 220 interface with the WTRU 210 using a Uu interface. Although a single WTRU 210, three eNBs 220, and a single RN 240 are shown in FIG. 10, it should be apparent that any number of devices may exist and any combination of wireless and wired devices may be included in the wireless communication system access network 200.

Figure 11:
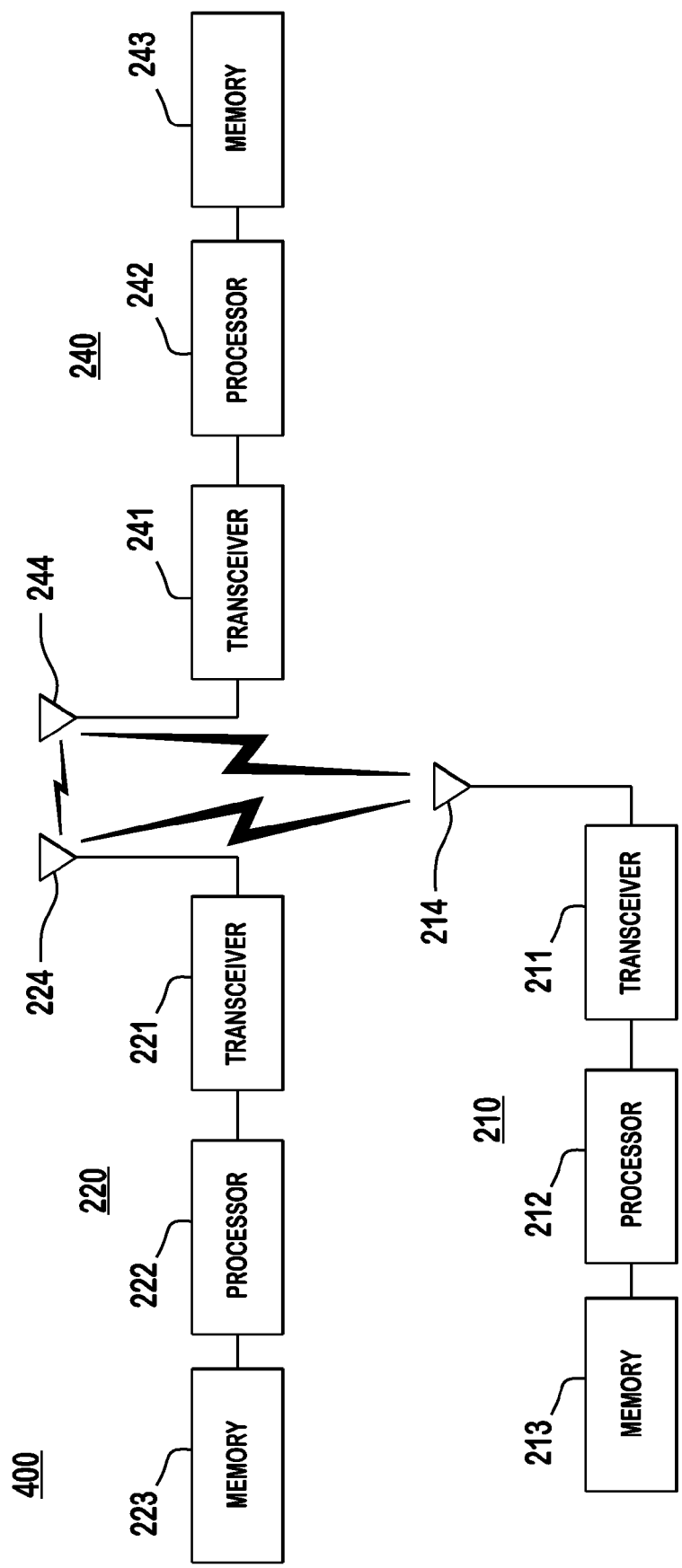
FIG. 11 is an example block diagram of an LTE wireless communication system including the WTRU, the eNB, and the RN.

FIG. 11 is an example block diagram of an LTE wireless communication system 400 including the WTRU 210, the eNB 220, and the RN 240. The WTRU 210, the eNB 220 and the RN 240 are configured to perform a wireless communication, flow control and handover in accordance with embodiments disclosed herein.

In addition to the components that may be found in a typical WTRU, the WTRU 210 includes at least one transceiver 211, a processor 212 with an optional linked memory 213, and an antenna 214. The processor 212 is configured to perform, either alone or in combination with software, wireless communication, flow control and handover in accordance with embodiments disclosed herein. The transceiver 211 is in communication with the processor 212 and the antenna 214 to facilitate the transmission and reception of wireless communications. The WTRU 210 may be in communication either with the eNB 220 or the RN 240.

In addition to the components that may be found in a typical eNB, the eNB 220 includes at least one transceiver 221, a processor 222 with an optional linked memory 223, and antennas 224. The processor 222 is configured to perform, either alone or in combination with software, wireless communication, flow control and handover in accordance with embodiments disclosed herein. The transceivers 221 are in communication with the processor 222 and antennas 224 to facilitate the transmission and reception of wireless communications.

The RN 240 includes at least one transceiver 241, a processor 242 with an optional linked memory 243, and antennas 244. The processor 242 is configured to perform, either alone or in combination with software, wireless communication, flow control and handover in accordance with embodiments disclosed herein. The transceiver 241 is in communication with the processor 242 and antennas 244 to facilitate the transmission and reception of wireless communications.

Figure 12:
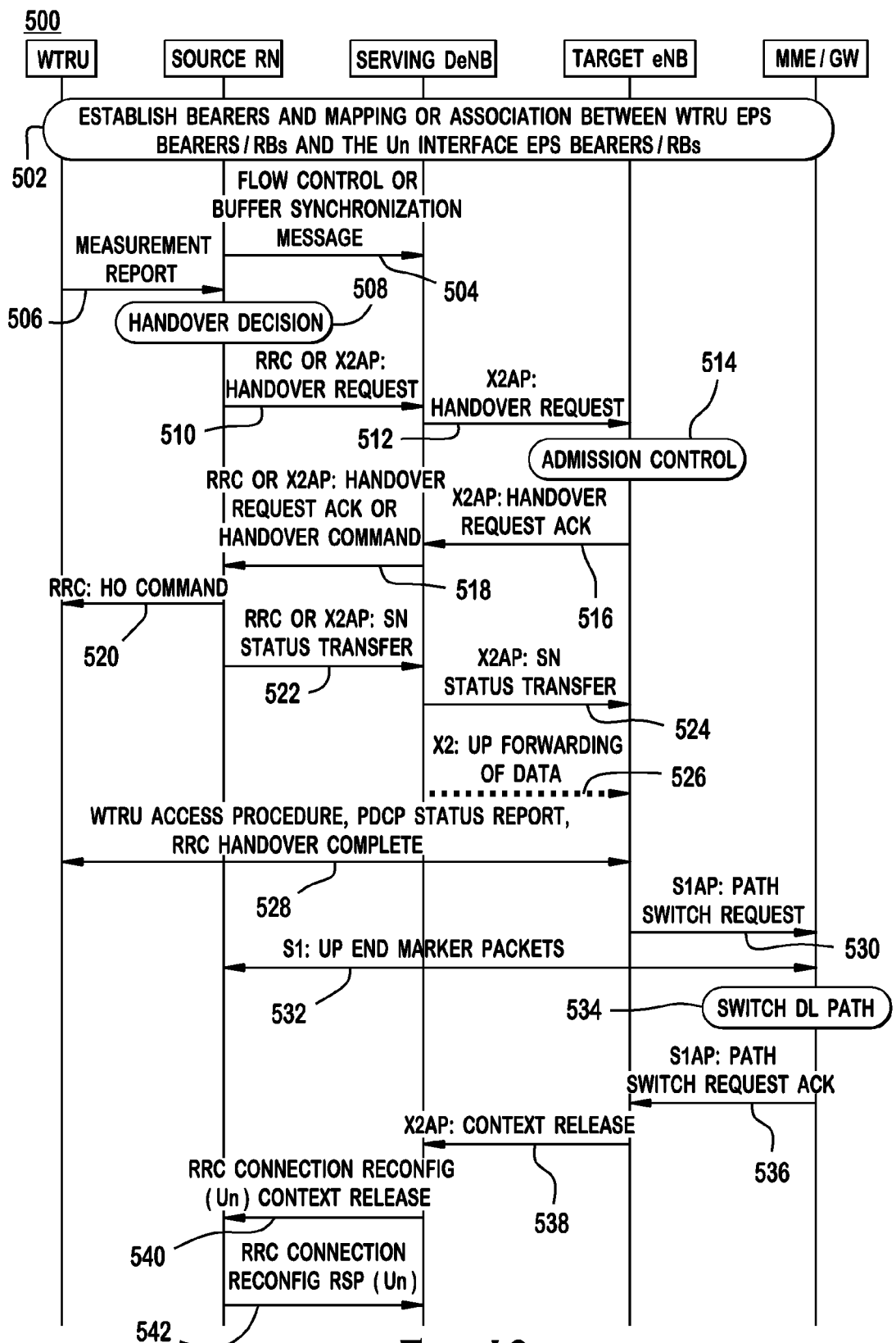
FIG. 12 shows an example process of handover within a network where an RN is deployed in accordance with one embodiment.

FIG. 12 shows an example process 500 of handover within a network where an RN is deployed in accordance with one embodiment. In this example, it is assumed that the WTRU is currently connected to an RN (source RN) and is being handed over to another eNB (target eNB). During a call set-up, a WTRU evolved packet system (EPS) bearer and a Uu radio bearer (RB), and an RN EPS bearer and a Un interface RB are established, and mapping or association between the WTRU EPS bearer/Uu RB and the RN EPS bearer/Un RB are established (502). The WTRU EPS bearer is a bearer established between the WTRU and the packet data network gate way (P-GW), and the RN EPS bearer is a bearer established between the RN and the P-GW. A Uu RB is a bearer established between the WTRU and the RN over a Uu interface, and a Un RB is a bearer established between the RN and the source DeNB over a Un interface.

The RN may maintain mapping or association between the WTRU EPS bearer/Uu RB and the RN EPS bearer/Un RB. The mapping may be maintained based on a unique WTRU context ID, RN bearer(s) (e.g., Internet protocol (IP) source address, IP destination address, user datagram protocol (UDP) source port, UDP destination port, Tunnel Endpoint ID), WTRU bearer(s) (e.g., IP source address, IP destination address, UDP source port, UDP destination port, Tunnel Endpoint ID), RN bearers ID(s), and WTRU bearers ID(s). This is applicable to any of the protocol architecture in FIGS. 2-9.

In accordance with this embodiment, the RN exchanges control messages with the serving DeNB (504). The control messages are exchanged to avoid or reduce the amount of data that needs to be re-forwarded back from the RN to the serving DeNB during handover and to keep the serving DeNB and RN buffers synchronized in terms of data packets that are not yet successfully transmitted over the Uu interface. The control messages may be transmitted periodically or based on a trigger. The control messages may be transmitted in a user plane using, for example, a PDCP control PDU. Alternatively, the control message may be transmitted in a control plane using radio resource control (RRC) or X2AP or any other similarly defined interface for communication between the RN and the serving DeNB.

The control message may include the first (i.e., oldest) unsuccessfully transmitted Un PDCP SDU sequence number (SN), (i.e., the first SN of the Un PDCP SDU that is unsuccessfully transmitted from the RN to the WTRU). For RLC AM data, "an unsuccessfully transmitted Un PDCP SDU" means a Un PDCP SDU corresponding to a Uu PDCP SDU that is not acknowledged as successfully received by the WTRU over the Uu interface. For RLC UM data, "an unsuccessfully transmitted Un PDCP SDU" means a Un PDCP SDU corresponding to a Uu PDCP PDU that is not yet submitted from the PDCP layer to a lower layer for transmission over the Uu interface at the RN or not positively acknowledged by hybrid automatic repeat request (HARQ) mechanism at the MAC layer. For RLC transparent mode (TM) data, "an unsuccessfully transmitted Un PDCP SDU" means a Un PDCP SDU corresponding to a Uu PDCP PDU that is not yet submitted from the PDCP layer to a lower layer for transmission over the Uu interface at the RN. Alternatively or additionally, the control message may include an indication to start/increase and stop/decrease transmission to the RN over the Un interface.

The RN may maintain one set of PDCP entities on the Uu interface and another set of PDCP entities on the Un interface, as shown in FIGS. 2-9, that may operate independently of each other. For flow control between the RN and the serving DeNB, the RN (and optionally the serving DeNB) may maintain mapping between the SN of the Uu PDCP PDUs transmitted to the WTRU over the Uu interface and the SN of the Un PDCP PDUs received from the serving DeNB over the Un interface.

The mapping may be performed using a look-up table which associates each Uu interface PDCP SN with a corresponding Un interface PDCP SN, or vice versa. The associated values of the two sequence numbers may not be the same because the sequence numbering may restart any time on a Un or Uu interface before it reaches the upper bound (e.g., 4095) while the other one continues to run. Alternatively, the association between the sequence numbers may be done via a translation table which maintains a set of offsets between the Un interface PDCP SNs and the Uu interface PDCP SNs. The translation table may include a single offset or multiple offsets.

In case the PDCP entity is allowed to concatenate multiple PDCP SDUs, (e.g., IP packets), into one PDCP PDU or segment a single PDCP SDU into multiple PDCP PDUs, the look-up table may be used for the association of the Un interface PDCP SNs with the Uu interface PDCP SNs, or vice versa.

The RN (and optionally the serving DeNB) may use this mapping to ensure a proper translation of the SN of the data transmitted by the RN over the Uu interface and the data received over the Un interface and vice versa such that the correct packets that need to be forwarded to the target handover node can be identified at the serving DeNB. Alternatively or additionally, the control message may indicate start/increase or stop/decrease a data flow, with or without the first unsuccessfully transmitted PDCP SDU SN.

Additionally, the DeNB may maintain mapping between a PDCP SDU and a PDCP PDU. For downlink transmission, the DeNB may include one PDCP SDU (e.g., IP packet) into one PDCP PDU. In this case the mapping may be a one-to-one mapping. Alternatively, the DeNB may concatenate multiple PDCP SDUs (destined to a single WTRU or multiple WTRUs) into one PDCP PDU, or segment one PDCP SDU into multiple segments such that one PDCP SDU is included in multiple PDCP PDUs. In this case the mapping may be many-to-one mapping. For the mapping, each PDCP SDU (or its segment) and each PDCP PDU may be assigned a different sequence number (SN) and the DeNB may track the PDCP SDU with the associated mapping. Similarly, the RN may maintain mapping between a PDCP SDU and a PDCP PDU that is transmitted over the Uu interface.

The mapping (or any combination of the mapping described above) allows the DeNB to decide whether RN buffer congestion or starvation has occurred, and this mapping information may be used to minimize data reforwarding during handover.

In accordance with this embodiment, the serving DeNB may keep all Un PDCP SDUs that are not yet acknowledged by the control message from the RN as being successfully transmitted over the Uu interface, (i.e., for RLC UM data, PDCP SDUs that are not submitted to a lower layer for transmission or not positively acknowledged by HARQ entity at the RN, and for RLC AM data, PDCP SDUs that are not positively acknowledged as successfully received by the RLC layer). Once the source DeNB receives the control message, a Un PDCP SDU(s) older than the first unsuccessfully transmitted PDCP SDU may be discarded from the source DeNB buffer.

The flow control may be performed on a WTRU basis, a WTRU EPS bearer basis, an RN EPS bearer basis, or any other basis. For the WTRU-basis control, the RN indicates to the source DeNB a first unsuccessfully transmitted Un PDCP SDU for a particular WTRU. For the WTRU EPS bearer basis, the RN indicates to the source DeNB a first un-successfully transmitted Un PDCP SDU in a particular WTRU EPS bearer.

The flow control on the individual WTRU EPS bearer basis or on the WTRU basis requires at the serving DeNB the knowledge of the mapping or association between the WTRU EPS bearers/Uu data radio bearers (DRBs) and the RN EPS bearers/Un DRBs and the ability to derive the WTRU EPS bearers/Uu DRBs from that association. This association may or may not be known to the serving DeNB depending on the protocol architecture. For example, in a case where the S1 interface terminates at the RN transparent to the DeNB, this association may not be known to the serving DeNB. In accordance with one embodiment, as part of the EPS bearer/Uu DRB establishment for a WTRU, the RN, (or alternatively the MME, the GW, or any combination of these nodes, or other node(s)), may convey to the source DeNB the WTRU context information including the association or mapping between the WTRU EPS bearer/Uu DRBs and the RN EPS bearer/Un DRBs. The WTRU context information may be a context ID. Alternatively, the WTRU context information may include the WTRU context ID together with information regarding the WTRU bearer(s) and the RN bearer(s) and their mapping/association.

The mapping information may be exchanged using a dedicated message sent to the serving DeNB after the WTRU EPS bearers/Uu DRBs establishment. The RN may convey the association or mapping information between the WTRU EPS bearer/DRBs and the Un interface EPS bearer/DRBs with the serving DeNB via the MME/GW during or after the EPS bearers/Uu DRBs establishment.

The serving DeNB may create a context for the WTRU and maintain the mapping between the WTRU EPS bearers/Uu DRBs and the RN EPS bearer/Un DRBs. Once the mapping between the WTRU EPS bearers/Uu DRBs and the RN EPS bearer/Un DRBs is established, the source DeNB may associate the received control message to a specific PDCP process. The serving DeNB may examine each packet going to the RN and may stop packets addressed to the WTRU whose context is included in the handover request message. This helps avoid redundant data forwarding from the serving DeNB to the RN.

In the case of flow control via PDCP control PDU exchange, the source DeNB may associate the received PDCP control PDU to a specific PDCP process associated with a given DRB based on the MAC header content. The MAC header in the case of non-WTRU multiplexing may be same as the LTE release 8 MAC header.

In the case of flow control using control plane RRC or X2AP signaling, the signaling message may optionally include, in addition to the first unsuccessfully transmitted PDCP SDU SN, information such the Uu RB IDs, WTRU context ID, and the mapping information between the WTRU EPS bearer/Uu DRB IDs and the RN EPS bearer/Un DRB IDs.

The RN buffer(s), (i.e., allocated in the memory 243), for the relevant bearer(s) may be designed to be relatively small while minimizing the risk of overflowing the Un interface with control messages. For example, the buffer size may be set as a function of the average data amount per transmission time interval (TTI) expected for the particular bearer being flow controlled. Because TTI Buffer is the average amount of data expected per TTI and "a" is the multiplying factor, the amount of data buffered at the RN may be equal to TTI Buffer multiplied by $\alpha$. The multiplying factor may be set such that a few TTI's worth of data is buffered by the RN. The average amount of data expected per TTI for a particular bearer may be derived for the QoS parameters such as guaranteed bit rate (GBR) or maximum bit rate (MBR) for guaranteed bit rate bearers. For non-guaranteed bit rate bearers, the aggregate maximum bit rate (AMBR) may be used. For instance, the AMBR may be divided by the number of non-guaranteed bit rate bearers to get a maximum data rate expected on each non-guaranteed bit rate bearer while the GBR may be used as a proxy of the average data rate expected on a guaranteed bit rate bearer.

Referring again to FIG. 12, the WTRU may send, either periodically or based on a trigger, a measurement report to the source RN as configured (506). Based on the measurement report, the source RN makes a handover decision (508) and sends a handover request message (X2AP or RRC message) to the serving DeNB (510). The handover request message may include the first unsuccessfully transmitted Un PDCP SDU SN. Alternatively, the first unsuccessfully transmitted Un PDCP SDU SN may be sent via a separate message before or after the handover request message. The source RN uses this message to inform the serving DeNB of the PDCP SDU SN that should be forwarded to the target handover node. The serving DeNB may not discard packets with SNs starting from the indicated SN and onward.

The RN may send the WTRU context information to the serving DeNB along with the handover request message. The context information can be just a context ID or alternatively the WTRU context ID together with the WTRU bearers, the RN bearer and their mapping. Based on the WTRU context information, the serving DeNB identifies the data flow(s) that belongs to the WTRU for which a handover is being triggered. The serving DeNB may examine each packet going to the RN and stop packets addressed to the WTRU whose context is included in the handover request message. This helps avoid redundant data forwarding.

Optionally, the source RN may notify the serving DeNB of the start of the handover to avoid redundant data reforwarding back from the source RN to the serving DeNB because the serving DeNB may not know that a handover for the WTRU has been initiated (because the handover request message might be transparent to the serving DeNB depending on the protocol architecture), and the serving DeNB may continue forwarding data to the source RN. The method is also designed to avoid reforwarding to the DeNB, data sent to the RN by the DeNB before the start of the handover.

The serving DeNB forwards the handover request message to the target eNB (512). The target eNB performs an admission control (514). Admission control may be performed by the target eNB based on the EPS bearer quality of service (QoS) information to increase the likelihood of a successful handover, if the resources can be granted by the target eNB. The target eNB configures the required resources according to the received EPS bearer QoS information and reserves resources, such as a cell radio network temporary identity (C-RNTI), etc.

The target eNB sends a handover request ACK message to the serving DeNB (516). The handover request ACK message includes a transparent container to be sent to the WTRU as an RRC message to perform the handover. The container may include parameters, such as a new C-RNTI, target eNB security algorithm identifiers for the selected security algorithms, a dedicated random access channel (RACH) preamble, and the like.

The serving DeNB may send the handover request ACK message or alternatively a handover command message (X2AP or RRC message) to the RN (518). The handover request ACK message (or alternatively the handover command message) may include the first (i.e., oldest) SN of the Un PDCP SDU that has not been discarded by the serving DeNB, (i.e., the starting point of the data buffering at the serving DeNB).

This information may be used by the RN to determine what PDCP SDU(s) need to be forwarded in case of handover. The RN may use this information to determine if any packet still needs to be forwarded back from the RN to the serving DeNB. The RN may forward to the target handover node, (e.g., target eNB), all previously received packets that are not successfully transmitted to the WTRU up to the packet with the SN just before the SN indicated in the handover request ACK message (or handover command). The SN indicated in the handover request ACK message (or handover command) may be the same as the first unsuccessfully transmitted PDCP SDU SN indicated by the RN in the handover request message (or the control message). This information may be sent via a separate message before or after the handover request ACK or handover command message. The RN may implicitly derive this SN if this information is not included in the handover request ACK or handover command message.

The RN sends a handover command message to the WTRU (520). Once the RN has frozen its transmitter and receiver, and stopped transmitting or receiving data to and from the WTRU, the RN may send an SN status transfer message to the target eNB via the serving DeNB (or alternatively directly) (522, 524). The conventional 3GPP R8 X2AP SN status transfer message may be re-used or a new RRC SN status transfer message with similar content as the X2AP SN status transfer message may be used.

The SN status transfer message conveys the uplink PDCP SN receiver status and the downlink PDCP SN transmitter status of E-RABs for which PDCP status preservation applies, (i.e., for RLC AM). The uplink PDCP SN receiver status includes at least the PDCP SN of the first missing UL SDU. The downlink PDCP SN transmitter status indicates the next PDCP SN that the target eNB needs to assign to new SDUs. In accordance with one embodiment, the SN status transfer message may include the first unsuccessfully transmitted downlink Un PDCP SDU SN. Alternatively, this information may be sent via a separate control message issued before or after the SN status transfer message for the purpose of updating the serving DeNB with the latest information so that the RN may forward the exact downlink data that needs to be forwarded. By virtue of the flow control (or RN versus DeNB buffer synchronization) in support of handover, the serving DeNB may have at the time of the handover all the Un interface PDCP SDUs in the RN buffer and most likely additional PDCP SDUs already successfully transmitted over the Uu interface. The purpose of extending the SN status transfer message is to minimize any redundant data forwarding by the serving DeNB.

The serving DeNB forwards data to the target eNB (526). For downlink data, the serving DeNB may forward all PDCP SDUs in its buffer starting from the first unsuccessfully transmitted Un PDCP SDU as reported by the RN. The first unsuccessfully transmitted Un PDCP SDU SN may be derived from the SN status transfer message from the RN, or may be explicitly signaled to the serving DeNB as part of the SN status transfer message or with a separate message. In the case of using stop/decrease and start/increase indications in the flow control, the source DeNB may forward all PDCP SDUs not yet delivered over the Un interface and the RN may forward all PDCP PDUs (or SDUs) received over the Un interface but not yet successfully transmitted over the Uu interface.

The WTRU performs synchronization to the target eNB and accesses the target cell via an RACH, and the target eNB responds with UL allocation and timing advance, and when the WTRU has successfully accessed the target cell, the WTRU sends the RRC handover complete message (528).

The target eNB sends a path switch request message to the MME/GW to inform that the WTRU has changed cell (530). The serving GW switches the downlink data path to the target eNB and sends one or more S1-UP end marker packets on the old path to the source RN and/or the source DeNB and then releases any U-plane/transport network layer (TNL) resources towards the source RN (532, 534).

The MME confirms the path switch request message with the path switch ACK message (536). After receiving the path switch ACK message from the MME, the target eNB sends a context release message to the source DeNB to inform success of handover and trigger the release of resources by the source DeNB (538). Upon reception of the context release message, the source DeNB sends an RRC connection reconfiguration message to the source RN, which responds with an RRC connection reconfiguration response message (540, 542).

Figure 13:
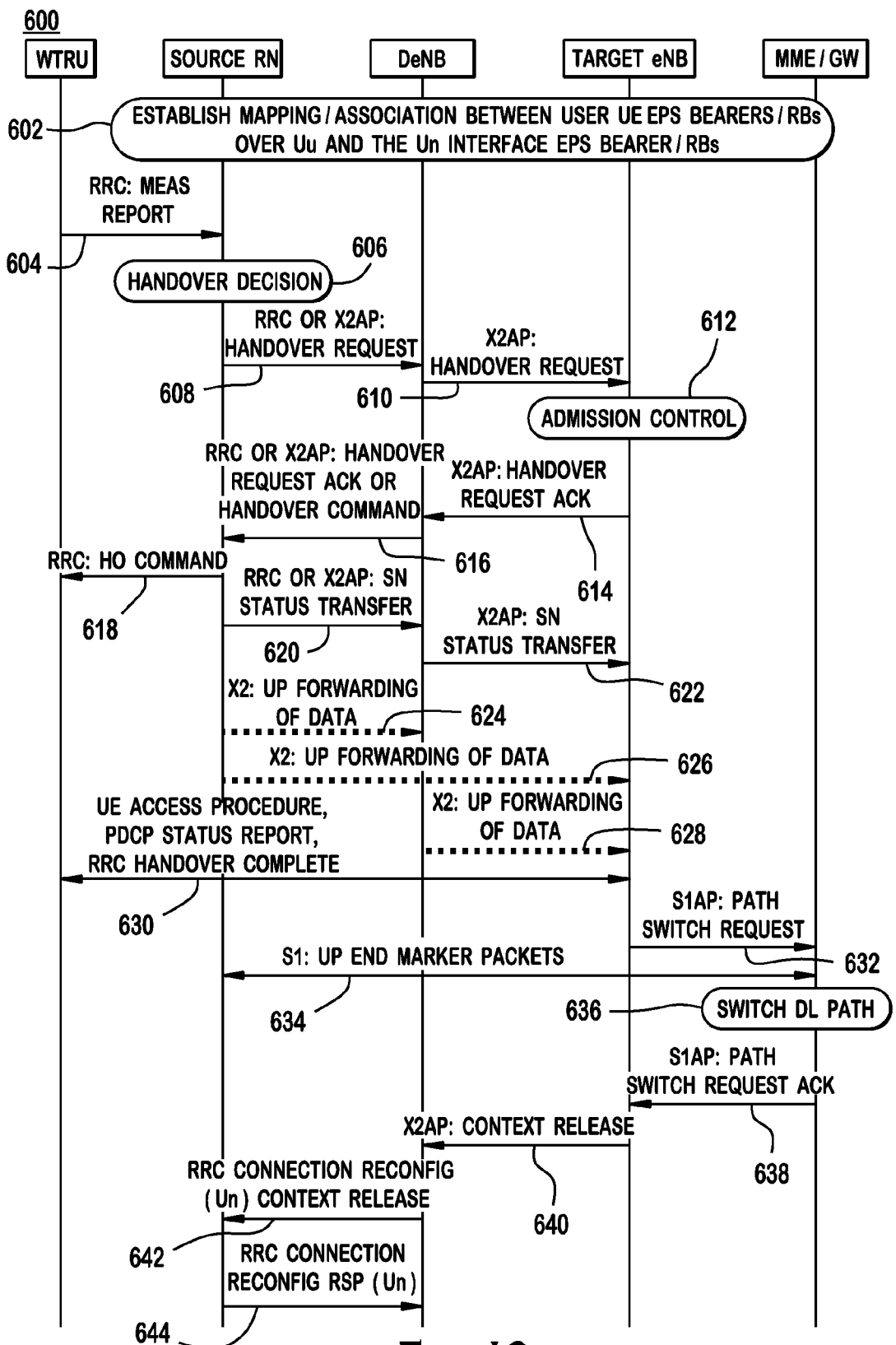
FIG. 13 is a flow diagram of an example process for handover within a network where an RN is deployed in accordance with another embodiment.

FIG. 13 is a flow diagram of an example process 600 for handover within a network where an RN is deployed in accordance with another embodiment. In this embodiment, a handover is performed with minimum or least amount of downlink data reforwarding back from the source RN to the serving DeNB and redundant data forwarding is reduced or avoided from the serving DeNB to the source RN. In this example, it is assumed that the WTRU is currently connected to an RN (source RN) and is being handed over to another eNB (target eNB). It should be noted that the embodiment is applicable to other scenarios.

During a call set-up, a WTRU EPS bearer and a Uu RB, and an RN EPS bearer and a Un interface RB are established, and mapping or association between the WTRU EPS bearer/Uu RB and the RN EPS bearer/Un RB are established (602). The RN maintains mapping or association between the WTRU EPS bearer/Uu RB and the RN EPS bearer/Un RB. The mapping is maintained based on a unique WTRU context ID, RN bearer(s) (e.g., IP source address, IP destination address, UDP source port, UDP destination port, Tunnel Endpoint ID), WTRU bearer(s) (e.g., IP source address, IP destination address, UDP source port, UDP destination port, Tunnel Endpoint ID), RN bearer ID(s), and WTRU bearer ID(s). This is applicable to any protocol architecture.

In a case where the S1 interface terminates at the RN, transparent to the DeNB, this association may not be known to the serving DeNB. In accordance with one embodiment, as part of the EPS bearers/Uu DRBs establishment for a WTRU, the RN, the MME, the GW, or any combination of the three nodes may convey to the source DeNB the WTRU context information including the association or mapping between the WTRU EPS bearer/Uu DRBs and the RN EPS bearer/Un DRBs. The WTRU context information may be a context ID. Alternatively, the WTRU context information may include the WTRU context ID together with the WTRU bearer(s), the RN bearer(s) and their mapping.

The mapping information may be exchanged using a dedicated message sent to the serving DeNB after the WTRU EPS bearers/Uu DRBs establishment. The RN may convey the association or mapping information between the WTRU EPS bearer/DRBs and the Un interface EPS bearer/DRBs with the serving DeNB via the MME/GW during the EPS bearers/Uu DRBs establishment.

The serving DeNB may create a context for the WTRU and maintain the mapping between the WTRU EPS bearers/Uu DRBs and the RN EPS bearer/Un DRBs. Once the mapping between the WTRU EPS bearers/Uu DRBs and the RN EPS bearer/Un DRBs is established, the source DeNB may associate the received control message to a specific PDCP process. The serving DeNB may examine each packet going to the RN and may stop packets addressed to the WTRU whose context is included in the handover request message. This helps avoid redundant data forwarding from the serving DeNB to the RN.

The mapping information may be exchanged between the RN (or the MME or the GW) and the serving DeNB using a dedicated message sent to the serving DeNB after the WTRU EPS bearers/Uu DRBs establishment. The RN may also convey the association or mapping information between the WTRU EPS bearer/DRBs and the Un interface EPS bearer/DRBs with the serving DeNB via the MME/GW during the EPS bearers/Uu DRBs establishment.

The RN may maintain one set of PDCP entities on the Uu interface and the other set of PDCP entities on the Un interface that may operate independently of each other. The RN and the serving DeNB maintain mapping between the SN of the Uu PDCP PDUs transmitted to the WTRU over the Uu interface and the SN of the Un PDCP PDUs received by the RN from the serving DeNB over the Un interface.

The mapping may be performed using a look-up table which associate each Uu interface PDCP SN with the Un interface PDCP SN, or vice versa. The associated values of the two sequence numbers may not be the same because the sequence numbering may restart any time on a Un or Uu interface before it reaches the upper bound (e.g., 4095) while the other one continues to run. Alternatively, the association between the sequence numbers may be done via a translation table which maintains a set of offset between the Un interface PDCP SNs and the Uu interface PDCP SNs. The translation table may include a single offset or multiple offsets.

Alternatively, in case the PDCP entity is allowed to concatenate multiple IP packets into one PDCP PDU or segment a single PDCP SDU into multiple PDCP PDUs, the look-up table may be used for the association of the Un interface PDCP SNs with the Uu interface PDCP SNs, or vice versa.

The RN (and optionally the serving DeNB) may use this mapping to ensure a proper translation of the SN of the data transmitted by the RN over the Uu interface and the data received over the Un interface and vice versa such that the correct packets that need to be forwarded to the target handover node can be identified at the serving DeNB.

Additionally, the DeNB may maintain mapping between a PDCP SDU and a PDCP PDU. For downlink transmission, the DeNB may include one PDCP SDU (i.e., IP packet) into one PDCP PDU. In this case the mapping may be a one-to-one mapping. Alternatively, the DeNB may concatenate multiple PDCP SDUs (destined to a single WTRU or multiple WTRUs) into one PDCP PDU, or segment one PDCP SDU into multiple segments such that one PDCP SDU is included in multiple PDCP PDUs. In this case the mapping may be many-to-one mapping. For the mapping, each PDCP SDU (or its segment) and each PDCP PDU may be assigned a different sequence number (SN) and the DeNB may track the PDCP SDU with the associated mapping. Similarly, the RN may maintain mapping between a PDCP SDU and a PDCP PDU that is transmitted over the Uu interface.

The mapping (or any combination of the mapping described above) allows the DeNB to decide whether RN buffer congestion or starvation has occurred, and this mapping information may be used to minimize data reforwarding during handover.

The WTRU may send periodically or based on a trigger a measurement report to the source RN as configured (604). Based on the measurement report, the source RN makes a handover decision (606) and sends a handover request message (X2AP or RRC) to the serving DeNB (608).

The handover request message may be extended to indicate to the serving DeNB to start buffering data (i.e., not discarding the downlink data sent to the RN). The handover request message may include the first unsuccessfully transmitted Un PDCP SDU SN. Alternatively, the data buffering request indication or the first unsuccessfully transmitted PDCP SDU SN may be sent via a separate message before or after the handover request message. The source RN may use this message to inform the serving DeNB of the SNs and corresponding PDCP SDUs that should be forwarded to the target handover node. Upon receipt of the data buffering request indication or the first unsuccessfully transmitted PDCP SDU SN, the serving DeNB may not discard packets and start buffering data with SNs starting from the indicated SN. This is performed to avoid redundant data re-forwarding by the RN, (i.e., forwarding back to the serving DeNB DL data sent by the serving DeNB), after a handover started.

The RN may send the WTRU context information to the serving DeNB along with the handover request message. The WTRU context information may be just a context ID or alternatively the WTRU context ID together with information of the WTRU bearer(s) and the RN bearer(s) and their mapping/association. Based on the WTRU context information, the serving DeNB may identify the data flow(s) that belongs to the WTRU for which a handover is being triggered. The serving DeNB may examine each packet going to the RN and stop packets addressed to the WTRU whose context is included in the handover request message. This helps avoid redundant data forwarding.

The serving DeNB forwards the handover request message to the target eNB (610). The target eNB performs an admission control (612). Admission control may be performed by the target eNB based on the EPS bearer quality of service (QoS) information to increase the likelihood of a successful handover, if the resources can be granted by the target eNB. The target eNB configures the required resources according to the received EPS bearer QoS information and reserves resources, such as a cell radio network temporary identity (C-RNTI), etc.

The target eNB sends a handover request ACK message to the serving DeNB (614). The handover request ACK message includes a transparent container to be sent to the WTRU as an RRC message to perform the handover. The container may include parameters, such as a new C-RNTI, target eNB security algorithm identifiers for the selected security algorithms, a dedicated RACH preamble, and the like.

The serving DeNB may send the handover request ACK message or alternatively a handover command message (X2AP or RRC) to the RN (616). The handover request ACK message (or alternatively the handover command message) may include the SN where source DeNB started buffering data. This SN may be older than the first unsuccessfully transmitted PDCP SDU SN provided by the RN. This information may be used by the RN to determine what PDCP SDU need to be forwarded in case of handover. The SN indicated in the handover request ACK message may be the same to the SN indicated by the source RN in the handover request message. This information may be sent separately after or before the handover request ACK message.

The RN sends a handover command message to the WTRU (618). Once the RN has frozen its transmitter and receiver, and stop transmitting or receiving data to and from the WTRU, the RN may send an SN status transfer message to the target eNB via the serving DeNB (620, 622). The conventional 3GPP R8 X2AP SN status transfer message may be re-used or a new RRC SN status transfer message with similar content as the X2AP SN status transfer message may be defined.

The SN status transfer message conveys the uplink PDCP SN receiver status and the downlink PDCP SN transmitter status of E-RABs for which PDCP status preservation applies, (i.e., for RLC AM). The uplink PDCP SN receiver status includes at least the PDCP SN of a next expected in-sequence uplink service data unit. The downlink PDCP SN transmitter status indicates the next PDCP SN that the target eNB needs to assign to new SDUs. In accordance with one embodiment, the SN status transfer message may include the first unsuccessfully transmitted downlink Un interface PDCP SDU SN. Alternatively, this information may be sent via a separate message issued before or after the SN status transfer message for the purpose of updating the serving DeNB with the latest information so that the RN may forward the exact downlink data that needs to be forwarded.

The source RN forwards data to the serving DeNB or directly to the target eNB (624, 626). In a case where downlink data forwarding is required and based on its knowledge of the data already transmitted over the Un interface that the DeNB has kept in its buffer, the source RN may forward PDCP SDUs not in the serving DeNB buffer. If the source RN knows that the source DeNB has not kept data that has already been transmitted over the Un interface, the source RN may forward all SDUs received over the Un interface that are not yet successfully transferred to the WTRU over the Uu interface.

For downlink data, the serving DeNB forwards all PDCP SDUs in its buffers starting from the first unsuccessfully transmitted Un PDCP SDU as reported by the RN (628). The first unsuccessfully transmitted PDCP SDU SN may be derived from the SN status transfer message from the RN or may be explicitly signaled to the serving DeNB as part of the SN status transfer message or with a separate message.

The WTRU performs synchronization to the target eNB and accesses the target cell via an RACH, and the target eNB responds with UL allocation and timing advance, and when the WTRU has successfully accessed the target cell, the WTRU sends the RRC handover complete message (630).

The target eNB sends a path switch request message to the MME/GW to inform that the WTRU has changed a cell (632). The serving GW switches the downlink data path to the target eNB and sends one or more S1-UP end marker packets on the old path to the source RN and/or the source DeNB and then releases any U-plane/TNL resources towards the source RN (634, 636).

The MME confirms the path switch request message with the path switch acknowledgment message (638). After receiving the path switch ACK message from the MME, the target eNB sends a context release message to the source DeNB to inform success of handover and trigger a release of resources by the source DeNB (640). Upon reception of the context release message, the source DeNB sends an RRC connection reconfiguration message to the source RN, which responds with an RRC connection reconfiguration response message (642, 644).

It should be noted that the embodiments are equally applicable to the handover scenario that the WTRU is handed over from any node to any node, for example from the source RN to the serving DeNB that controls the source RN or another RN controlled by either the serving DeNB or neighbor eNB. It should also be noted that the embodiments are applicable to both downlink and uplink.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

What is claimed is:

1. A method for performing a handover with a relay node (RN), the method comprising:
    an RN receiving a packet data convergence protocol (PDCP) protocol data unit (PDU) from a donor evolved Node-B (DeNB);
    the RN transmitting the PDCP PDU to a wireless transmit/receive unit (WTRU);
    the RN receiving a measurement report from the WTRU;
    the RN making a handover decision based on the measurement report; and
    the RN sending a handover request message to the DeNB with information including a first unsuccessfully transmitted PDCP sequence number (SN).

2. The method of claim 1 further comprising:
    the RN sending a control message to the DeNB including a first unsuccessfully transmitted PDCP SN.

3. The method of claim 1 further comprising:
    the RN receiving a handover request acknowledge message from the DeNB with information including a first PDCP SN that is not discarded at the DeNB.

4. The method of claim 3 further comprising:
    the RN forwarding a PDCP PDU to the DeNB based on the information received from the DeNB.

5. The method of claim 1 wherein the RN provide the DeNB with WTRU context information along with the handover request message.

6. The method of claim 1 wherein the RN maintains a mapping table between a PDCP SN of data transmitted to the WTRU over a wireless interface between the RN and the WTRU and a PDCP SN of data received by the RN over a wireless interface between the RN and the DeNB.

7. The method of claim 1 further comprising:
    the RN providing the DeNB with WTRU context information during a call setup including at least one of a WTRU context identity (ID), RN bearer information, WTRU bearer information, RN bearer ID, or WTRU bearer ID.

8. A relay node (RN) for wireless communication, the RN comprising:
    an antenna;
    a transceiver configured to receive from a donor evolved Node-B (DeNB) and transmit to a wireless transmit/receive unit (WTRU); and
    a processor configured to receive a packet data convergence protocol (PDCP) protocol data unit (PDU) from the DeNB, transmit the PDCP PDU to the WTRU, make a handover decision based on a measurement report received from the WTRU, and send a handover request message to the DeNB with information including a first unsuccessfully transmitted PDCP sequence number (SN).

9. The RN of claim 8 wherein the processor is configured to send a control message to the DeNB including a first unsuccessfully transmitted PDCP SN.

10. The RN of claim 8 wherein the processor is configured to receive a handover request acknowledge message from the DeNB with information including a first PDCP SN that is not discarded at the DeNB and forward a PDCP PDU to the DeNB based on information received from the DeNB.

11. The RN of claim 8 wherein the processor is configured to provide the DeNB with WTRU context information along with the handover request message.

12. The RN of claim 8 wherein the processor is configured to maintain a mapping table between a PDCP SN of data transmitted to the WTRU over a wireless interface between the RN and the WTRU and a PDCP SN of data received by the RN over a wireless interface between the RN and the DeNB.

13. The RN of claim 8 wherein the processor is configured to provide the DeNB with WTRU context information during a call setup including at least one of a WTRU context identity (ID), RN bearer information, WTRU bearer information, RN bearer ID, or WTRU bearer ID.

14. A method for performing a handover with a relay node (RN), the method comprising:
 a Node-B sending packet data convergence protocol (PDCP) protocol data units (PDUs) to an RN; and
 the Node-B receiving a handover request message from the RN with information including a first unsuccessfully transmitted PDCP sequence number (SN), wherein the Node-B discards a PDCP PDU with an SN older than the first unsuccessfully transmitted PDCP SN.

15. The method of claim 14 further comprising:
 the Node-B receiving a control message from the RN including a first unsuccessfully transmitted PDCP SN, wherein the Node-B discards a PDCP PDU with an SN older than the first unsuccessfully transmitted PDCP SN indicated via the control message.

16. The method of claim 14 further comprising:
 the Node-B sending a handover request acknowledge message to the RN with information including a first PDCP SN that is not discarded at the Node-B.

17. The method of claim 14 wherein the Node-B receives WTRU context information along with the handover request message.

18. The method of claim 14 further comprising:
 the Node-B receiving WTRU context information during a call setup including at least one of a WTRU context identity (ID), RN bearer information, WTRU bearer information, RN bearer ID, or WTRU bearer ID; and
 the Node-B establishing a mapping between a WTRU bearer and an RN bearer.

19. The method of claim 18 further comprising:
 the Node-B receiving an S1-UP end marker packet.

20. A Node-B for performing a handover with a relay node (RN), the Node-B comprising:
 an antenna;
 a transceiver configured to communicate wirelessly with an RN; and
 a processor configured to send packet data convergence protocol (PDCP) protocol data units (PDUs) to the RN, and receive a handover request message from the RN with information including a first unsuccessfully transmitted PDCP sequence number (SN), wherein the processor discards a PDCP PDU with an SN older than the first unsuccessfully transmitted PDCP SN.

21. The Node-B of claim 20 wherein the processor is configured to receive a control message from the RN including a first unsuccessfully transmitted PDCP SN and discard a PDCP PDU with an SN older than the first unsuccessfully transmitted PDCP SN indicated via the control message.

22. The Node-B of claim 20 wherein the processor is configured to send a handover request acknowledge message to the RN with information including a first PDCP SN that is not discarded at the Node-B.

23. The Node-B of claim 20 wherein the processor receives WTRU context information along with the handover request message.

24. The Node-B of claim 20 wherein the processor is configured to receive WTRU context information during a call setup including at least one of a WTRU context identity (ID), RN bearer information, WTRU bearer information, RN bearer ID, or WTRU bearer ID and establish a mapping between a WTRU bearer and an RN bearer.

25. The Node-B of claim 24 wherein the processor is configured to receive an S1-UP end marker packet.

* * * * *